(12) United States Patent
Helot et al.

(10) Patent No.: US 7,328,171 B2
(45) Date of Patent: Feb. 5, 2008

(54) SYSTEM AND METHOD FOR ORDERING CONSUMER ITEMS IN ELECTRONIC COMMERCE

(75) Inventors: Jacques H Helot, Rotterdam (NL); Masahiko Muranami, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 383 days.

(21) Appl. No.: 09/439,626

(22) Filed: Nov. 12, 1999

(65) Prior Publication Data

US 2002/0169675 A1    Nov. 14, 2002

(51) Int. Cl.
*G06Q 30/00* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | | | |
|---|---|---|---|---|---|
| 5,111,392 | A | * | 5/1992 | Malin | 705/27 |
| 5,986,670 | A | * | 11/1999 | Dries et al. | 345/629 |
| 6,052,669 | A | * | 4/2000 | Smith et al. | 705/26 |
| 6,105,003 | A | * | 8/2000 | Morohashi et al. | 705/26 |
| 6,128,600 | A | * | 10/2000 | Imamura et al. | 705/27 |
| 6,167,383 | A | * | 12/2000 | Henson | 705/26 |
| 6,195,094 | B1 | * | 2/2001 | Celebiler | 345/764 |
| 6,285,983 | B1 | * | 9/2001 | Jenkins | 705/10 |
| 6,331,858 | B2 | * | 12/2001 | Fisher | 345/582 |
| 6,353,824 | B1 | * | 3/2002 | Boguraev et al. | 707/5 |
| 6,430,539 | B1 | * | 8/2002 | Lazarus et al. | 705/26 |
| 6,437,800 | B1 | * | 8/2002 | Malamud et al. | 715/711 |

FOREIGN PATENT DOCUMENTS

JP    3-92947    *    4/1991

OTHER PUBLICATIONS

Taylor, "JavaScript Image Rollovers", Dec. 4, 1996.*
Yousefi et al., "A Software solution broker for technical consultants", Hewlett-Packard Journal, v46, n2, p. 93 (9), Apr. 1995.*

* cited by examiner

*Primary Examiner*—Michael Cuff (57) ABSTRACT

This present invention is embodied in a system and method for ordering a consumer item (such as a product or a service) in an interactive computer environment. The system of the present invention includes a user interface that provides automatic and real-time updating of attributes and available options of the consumer item being ordered. Further, the user interface provides a true visual or audio representation of the consumer item as it is being ordered. The present invention also includes a method for ordering a consumer item using this system. The method includes separating the consumer item into intuitive portions that includes base components and categories of available options. The base components and options categories are presented to a consumer through the user interface and the consumer selects the available choices. The method of the present invention includes automatic and real-time updating of attributes and available options so as to provide the consumer with current information and ensure that the consumer cannot select an unavailable option.

20 Claims, 11 Drawing Sheets

SYSTEM AND METHOD FOR ORDERING CONSUMER ITEMS IN ELECTRONIC COMMERCE

FIELD OF THE INVENTION

The present invention relates in general to electronic commerce and more particularly to a system and a method for ordering consumer items (including products and services) through an interactive computer environment.

BACKGROUND OF THE INVENTION

Electronic commerce (or "e-commerce") is quickly becoming a popular way to for consumers to order consumer items. Consumer items include both tangible and intangible commodities, such as, for example, products and services. E-commerce is the conduct of commerce in consumer items with the assistance of electronic tools (such as a computer or television connected to the Internet; a telephone; and a facsimile machine). For example, many businesses and merchants provide consumers with an opportunity to order consumer items at a web site provided on the Internet.

Typically, the ordering process for a consumer item includes having the consumer review a text-based list of choices (such as a drop-down box) containing written descriptions of the consumer item. Next, the consumer is directed to make a selection based solely on these written descriptions. Some ordering processes include a graphical representation (such as a drawing or picture) of the consumer item but only provide a generic representation that applies to several different combinations of consumer item.

One problem, however, with both the text-based and generic picture ordering is that the consumer cannot see exactly what is being ordered. This can lead to consumer dissatisfaction when the order is received and a high incidence of returned orders. Another problem is that options available with a consumer item frequently depend on a previous choice, and these choices are not automatically updated. For example, if a notebook computer is being ordered the hard drives available may depend on the type of processor chosen, so that a 10 gigabyte hard drive may only be available if a 500 MHz processor is selected. Frequently, however, the consumer will select a 500 MHz processor with an 8 gigabyte hard drive and, because the subsequent choices are not automatically updated, is not aware until after placing the order that only the 10 gigabyte hard drive is available with the 500 MHz processor. This can cause considerable consumer frustration and may even cause the consumer to cancel the transaction.

Therefore, as demand continues to grow for e-commerce there is needed is a simple and intuitive ordering system and method for a consumer to order consumer items. In addition, there is a need for an ordering system and method that provides the consumer with a real-time true representation of what is being ordered so that the consumer will not be disappointed when the order is delivered. Moreover, the ordering system and method would include automatic and real time updating of the available options so that the consumer could not choose an option that was unavailable.

SUMMARY OF THE INVENTION

To overcome the limitations in the prior art as described above, and to overcome other limitations that will become apparent upon reading and understanding the present specification, the present invention is embodied in a system and method for ordering consumer items (such as products and services) in electronic commerce. The present invention provides a simple and intuitive user interface that presents to the consumer a real-time true representation of what is being ordered. In addition, the attributes of a consumer item (such as cost, weight and size) and the available options are updated in real time so that the consumer is kept informed as what is being ordered and cannot inadvertently select an unavailable option.

The ordering system of the present invention includes an interactive computer environment (such as a networked computer environment) having a client and a server. A user (or consumer) uses the client to place the order. The client includes a control module, which controls the flow of data and information within the system and a user interface, which presents information and results to the consumer as a graphical or an audio representation. The user interface also permits the consumer to interact with the ordering system and select any available options presented.

The server, which is used by a merchant to receive the order placed by the consumer, includes a database, statistical module and an update module. The database stores data used by the system including control data, program data, data structure and other types of data. The statistical module is coupled to the client and the database and receives statistical data regarding the ordering process (such as the number of times an available option is selected). The update module provides automatic real-time updates for the user interface so that the consumer is constantly aware of the status and parameters concerning an order. These parameters include, for example, what has been ordered, the available options and total cost of the order.

The present invention is also embodied in a method for ordering consumer items in electronic commerce using the above-described system. The method includes dividing a consumer item into intuitive pieces that include a base component (which is preferably used as a starting point for the order) and categories of available options that may be added to the base component. A base component is then presented to the consumer through the user interface and the consumer is invited to make a selection. Once a selection is made the user interface, representation of the consumer item and the available options are updated. This presentation, selection and updating is then repeated for the remainder of option categories and the consumer is invited to finalize the order. Finalizing the order may include, for example, specifying the method of payment or the method of shipment.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the present invention.

Referring now to the drawings in which like reference numbers represent corresponding parts throughout.

DETAILED DESCRIPTION OF THE PREFERRED EMBODIMENTS

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

Simple and intuitive ordering of products and services in electronic commerce is quite appealing for consumers. The present invention provides an interactive computer environment that makes the ordering of virtually any consumer item an easy and intuitive procedure. In particular, the user interface of the present invention presents to a user (or consumer) a consumer item that has been divided into a base component and corresponding available options. Once the consumer selects a desired base component and available options are quickly (in real time) and automatically updated. This real-time updating of available options provides the consumer with a real-time knowledge of the options available after each previous choice and consumer is prevented from choosing an option that is not available with a particular base component or option. In addition, attributes (such as cost, weight and size) of the consumer item being ordered are updated automatically and in real time.

The user interface of the present invention provides the consumer with a real-time representation of the consumer item being ordered. The user interface presents to the consumer a representation of the base component and options that the consumer has selected. If an additional option is selected the option is immediately added to the representation so that the consumer is provided with an up-to-the-minute representation of the consumer item being ordered.

The system and method of the present invention can be used to order a plurality of diverse consumer items, including products and services. By way of example and not limitation, the present invention may be used to order products such as notebook computers, floral arrangements, pizza, automobiles, clothing and accessories, catered meals, table settings, window treatments, custom homes, aircraft and boats, to list a few. The present invention allows the user to see exactly what is being ordered, what options are currently available and provides useful information that helps the user make informed decisions regarding the ordering process. This information depends on the product being ordered, and may include, for example, costs, weight, calories, colors, size, weight, gas mileage, material, taxes, registration fees, insurance costs, room size and patterns. The present invention may also be used to order services, such as, for example, insurance plans, vacation packages and extended warranties. Depending on the services being ordered, the present invention provides useful information to the user, such as, for example, costs, ticket availability and travel time.

II. Structural Overview

Figure 1:
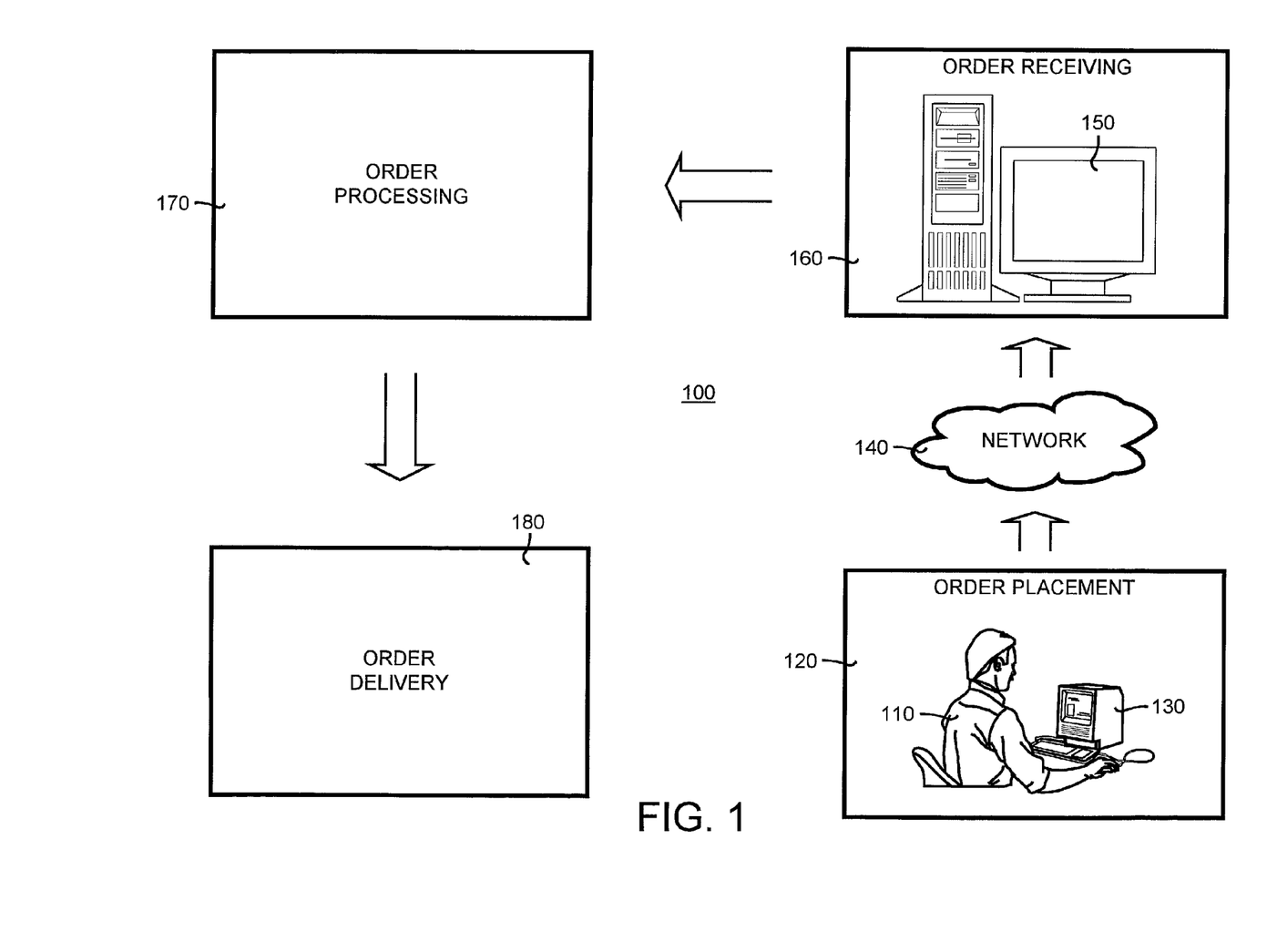
FIG. 1 is a block diagram of an overall ordering system incorporating the present invention.

FIG. 1 is a block diagram of an overall ordering system incorporating the present invention. In general, an ordering system 100 that incorporates the present invention is provided for a user (or consumer) 110 to order a consumer item from a merchant. The consumer 110 uses the present invention to place an order (box 120) using a remote unit or client 130 (discussed further below). The client 130 may be located, for example, in the consumer's home, in the merchant's store or in a booth at a shopping mall.

The client 130 is coupled over a network 140 to a host unit or server 150 that receives the order (box 160). The server 150 (discussed further below) may be located, for example, at a location away from the client 130, in the same general location as the client 130 and even on the same apparatus as the client 130. The order is then processed (box 170) and delivered (box 180) as directed by the consumer.

In the case where a product is ordered, delivery may be made, for example, by an express delivery service or by regular mail. Although the product usually will be delivered to the consumer 110 that ordered the product, in some cases the product may be delivered to a third-party designated by the consumer 110. In the case where a service has been ordered, delivery may occur in several ways including, for example, notification by mail of the commencement of insurance coverage.

Figure 2:
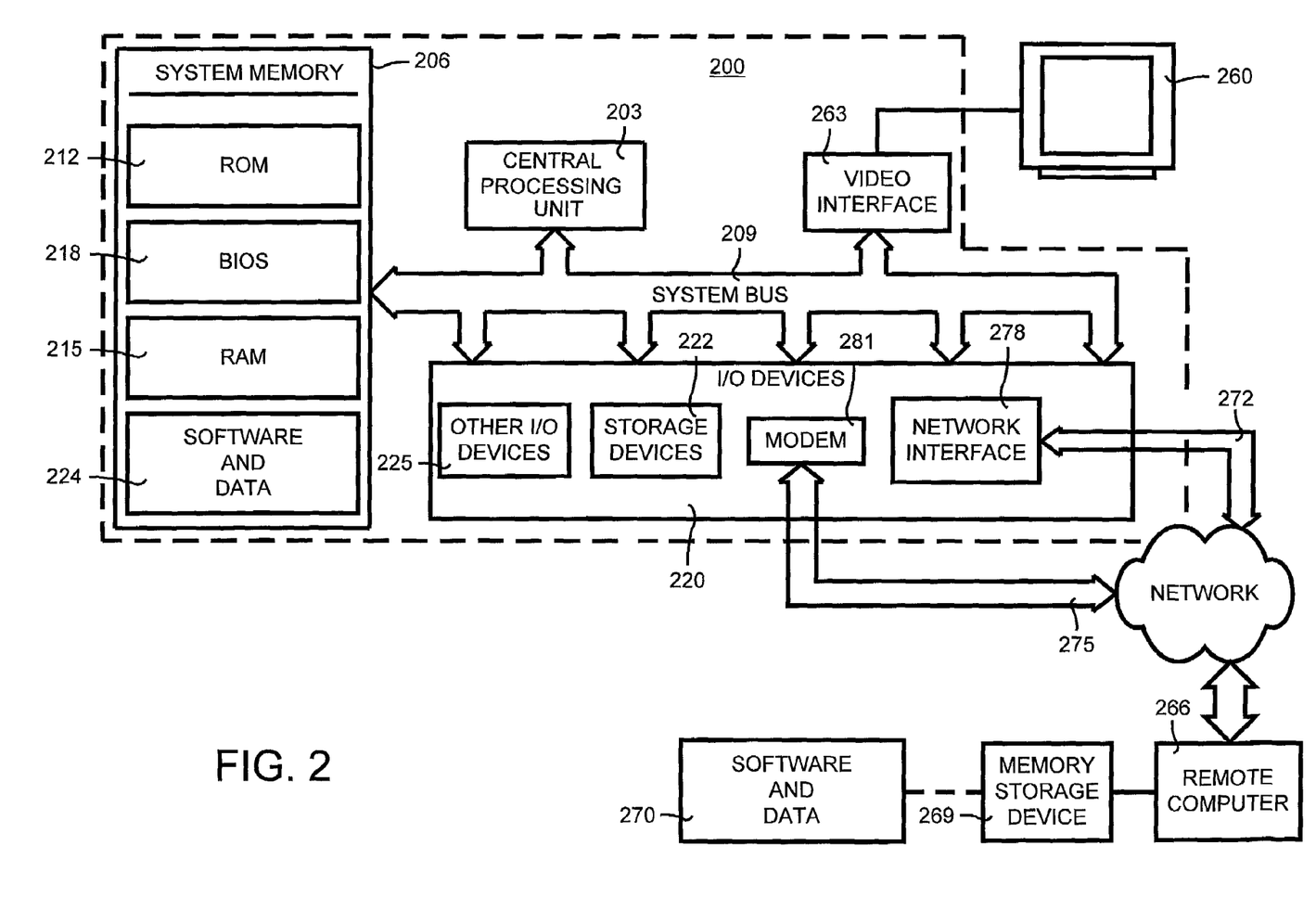
FIG. 2 is a block diagram illustrating an apparatus for carrying out the present invention.

FIG. 2 is a block diagram illustrating an apparatus for carrying out the present invention. The following discussion provides a general description of a suitable computing environment in which the present invention may be implemented. The invention will be described in the general context of computer-executable instructions (such as program modules) being executed by a computer.

As shown in FIG. 2, an exemplary system for implementing the present invention includes a general-purpose computing device in the form of a conventional computer 200. The computer 200 includes a central processing unit 203, a system memory 206 and a system bus 209. The system bus 209, which couples various system components including the system memory 206 to the central processing unit 203, may be any of several types of bus structures including memory bus or memory controller, a peripheral bus and a local bus using any of a variety of bus architectures.

The system memory 206 includes computer storage media in the form of read-only memory (ROM) 212 and random access memory (RAM) 215. A basic input/output system (BIOS) 218 is stored in the ROM 212 and contains the basic routines that help transfer information between components of the computer 200, such as during start-up.

The computer 200 may also include storage devices 222. The storage devices 222 include, for example, a hard disk drive, for reading from and writing to a hard disk, a magnetic disk drive, for reading from and writing to a removable magnetic disk, and an optical disk drive, for reading from and writing to a removable optical disk (such as, for example, a CD-ROM or other type of optical media). These drives and their associated computer-readable media provide storage of computer-readable instructions, data structures, program modules and other data for the computer 200. Although the exemplary environment described herein employs a hard disk, a removable magnetic disk and a removable optical disk, it should be appreciated that those skilled in the art would recognize that other types of computer-readable media can store data that can be accessed by the computer 200. Thus, computer-readable media may be any available media that is accessible by the computer 200. By way of example and not limitation, computer-readable media includes communication media and computer storage media.

For example, computer storage media includes RAM, ROM, erasable programmable read-only memory (EPROM), flash memory and other types of memory technology, CD-ROM, digital video disks (DVD) and other types of optical storage media, magnetic cassettes, magnetic tape, magnetic disk storage and other types of magnetic storage devices, and any other medium that can be used to store the desired information and that is accessible by the computer 200. Further, any combinations of the above is also included within the meaning of computer-readable media.

Numerous program modules may be stored on the hard disk, magnetic disk, optical disk, ROM 212 and RAM 215 including software and data 224. Software and data 224 include, for example, application programs, other program modules and program data. A user may interact with the computer 200 by entering commands and information through other input devices 225 such as a keyboard and pointing device (such as a mouse). Other input devices 225 may include, for example, a microphone, joystick, game pad, satellite dish, scanner, video camera, digital camera, and the like. These and other input devices 225 may be connected to the central processing unit 203 through, for example, a serial port, a parallel port, game port or a universal serial bus (USB) that is coupled to the system bus 209. A monitor 260 or other type of display device is connected to the system bus 209 through a video interface 263 (such as a video adapter). Further, additional peripheral devices (such as speakers and printers) may be connected to the computer 200.

The computer 200 may be operated in a networked environment using logical connections to one or more remote computers (such as a remote computer 266). The remote computer 266 may be a personal computer (PC), a server, a router, a network PC, a peer device or other type of network node, and typically includes several or all of the elements described above in connection with the computer 200. Only a memory storage device 269 having software and data 270 residing thereon, however, has been illustrated with the remote computer 266 in FIG. 2. The logical connections shown in FIG. 2 include a local area network (LAN) 272 and a wide area network (WAN) 275, such as, for example, the Internet and World-Wide Web (WWW). Such networking environments are commonplace in offices, enterprise-wide computer networks, intranets and the Internet.

If the computer 200 is used in a LAN networking environment, the computer 200 is coupled to the local network 272 through a network interface 278 (such as a network adapter). If the computer 200 is used in a WAN networking environment, the computer 200 is generally coupled to the WAN (such as the Internet) through a modem 281 or other means for establishing communications over the WAN (such as a cable modem).

In a networked environment, program modules depicted relative to the computer 200, or portions thereof, may be stored in the remote memory storage device 269. Further, in a networked environment the execution of computer-readable instructions within the program modules as well as processing and data manipulation may occur on the computer 200, the remote computer 266, or both. It will be appreciated that the network connections shown are exemplary and other means of establishing a communications link and transferring data between the computer 200 and the remote computer 266 may be used.

Figure 3:
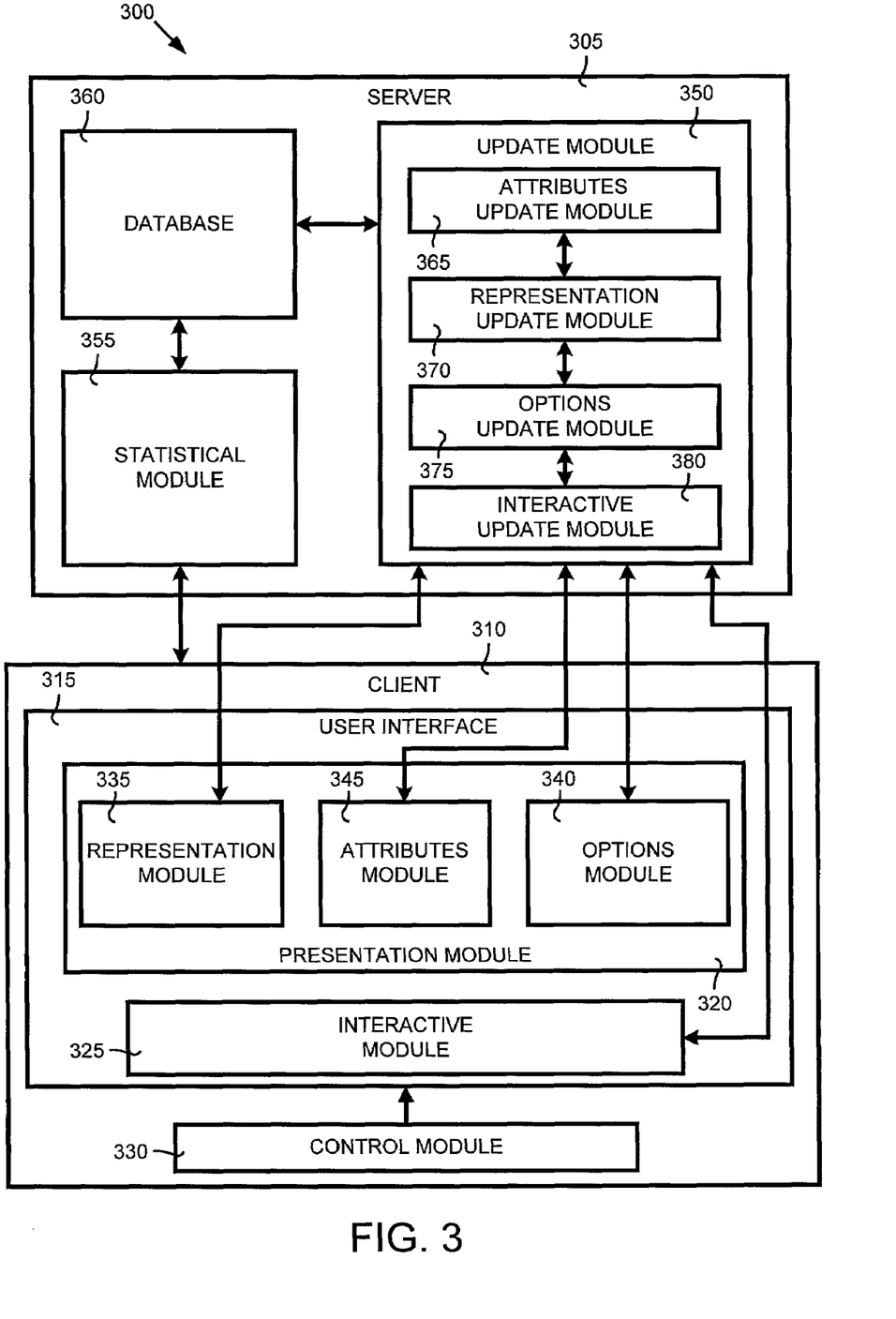
FIG. 3 is a block diagram illustrating an overview of the present invention.

FIG. 3 is a block diagram illustrating an overview of the present invention. The present invention is embodied in a system and a method for ordering a product or service using a user interface that provides real-time updating of available options and properties of the product or service. Preferably, as shown in FIG. 3, the ordering system 300 of present invention is implemented in a networked environment that includes a host unit or server 305 and a remote unit or client 310. The server 305 and the client 310 may be physically separate computer systems that are located at different locations or at the same location. Further, the server 305 and client 310 may be both located on the same computer system. If located on separate computer systems, the server 305 and client 310 communicate with each other and transfer data, instructions and results over a network (not shown) as discussed above.

The client 310 includes a user interface 315, such as a graphical user interface (GUI), for presenting to the consumer real-time information about the product or service being ordered. The user interface 315 includes a presentation module 320, for presenting a representation and attributes (such as characteristic information about the product or service), and an interactive module 325, for providing a means for a consumer interact with the ordering system. For example, the interactive module 325 can provide a way for a user to add an option by dragging and dropping. A control module 330 coupled to the user interface 315 provides control for the user interface and real time user interactivity by controlling the flow of data and updating of information between the server 305 and the client 310.

The presentation module 320 includes a representation module 335, which presents to a consumer a real-time representation of the product or service that has been ordered, including all the selected options. This representation includes a graphical representation (such as a photograph or an icon) and an audio representation (such as a spoken or musical description) of the product or service. The presentation module 320 also includes an options module 340, which provides the consumer with a real-time representation of the available options. Similar to the representation module 335, the representation includes a graphical and an audio representation. As explained further below in reference to FIG. 5, these available options generally depend on which base component and options have been previously selected. Further, the presentation module 320 includes an attributes module 345 that presents to the consumer a real-time record of certain attributes associated with the product or service. These attributes include any characteristic of the product or service that may be useful or desired by the consumer. By way of example and not limitation, these attributes include a total price for a product or service, total weight and size for a product, miles per gallon if the product is a vehicle, calories if the product is a food item and so forth. Virtually any characteristic associated with the product or service can be presented to the consumer through the attributes module 345.

The server 305 includes an update module 350 for updating the user interface 315, a statistical module 355 for providing statistical data regarding the order to the merchant and a database 360 for storing data pertaining to the ordering process. The update module 350, which is coupled to the representation module 335, the options module 340 and the attributes module 345, includes an attributes update module 365, a representation update module 370, an options update module 375 and an interactive update module 380. Each of the attributes, representation, options and interactive update modules (365, 370, 375, 380) provides updates for the attributes module 345, the representation module 335, the options module 340 and the interactive module 325, respectively.

The statistical module 355 receives and processes statistical data from the client 310. This statistical data, which has significance to the merchant, can be received from any of the modules on the client 310. This statistical data is generally user information and information regarding the order that is compiled from a plurality of users so that certain ordering trends and tendencies can be examined by the merchant. For example, the statistical data may provide insight into a consumer's state of mind by recording how long users hovered over particular options and how many consumers change began but did not complete the ordering process. This statistical information provides valuable data to merchants that permits merchants to modify their retail and marketing strategies to maximize profits and sales.

In a preferred embodiment of the invention the modules are located on the client 310 and the server 305 as shown in FIG. 3. Alternatively, other arrangements are possible. For example, the update module 350 may be located on the client 310 instead of the server 305, which would place more processing load on the client but also reduce the amount of information transmitted over the network. In another embodiment, the invention may be as shown in FIG. 3 except that the control module would be located on the server 305. In this embodiment nearly all of the processing would be performed by the server 305 and a great deal of information would be transmitted over the network. Those skilled in the art will recognize other arrangements other than those mentioned that may be better suited to a particular operating environment.

III. Operational Overview

Figure 4:
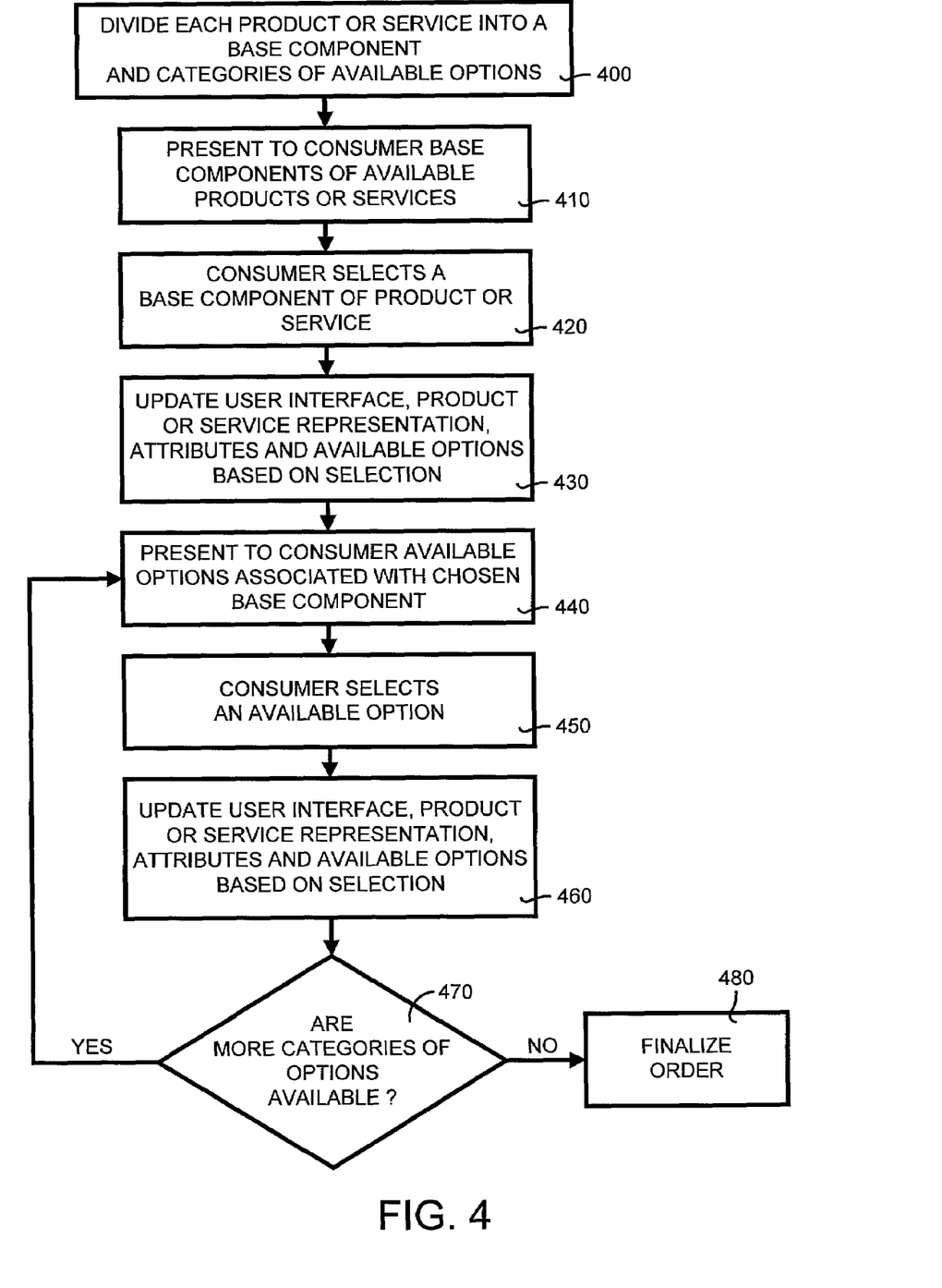
FIG. 4 is a flow diagram illustrating the general operational flow of the present invention.

FIG. 4 is a flow diagram illustrating the general operational flow of the present invention. Specifically, a product or service to be presented to a consumer is divided into a base component and categories of available options (box 400). Although the division depends greatly on the type of product or service, in a preferred embodiment the division is one in which the product or service is presented to the consumer in a clear and intuitive manner. By way of example and not limitation, if the product is a pizza, the base component may be the diameter (assuming a round pizza) of the pizza. In addition, a plurality of base components may be available for each product or service. For instance, the pizza may be available in small (8-inch), medium (12-inch) and large (16-inch) sizes. Continuing with the pizza example, the first available option may be the type of crust (such as regular thin, regular thick, soft thin and soft thick). The next available option may be type of vegetable (such as tomatoes, mushrooms, spinach and onions). Other categories of options, such as type of meat, types of cheese and so forth, may also be used when dividing the pizza into available options.

Next, the product or service is presented to the consumer through the client (box 410). This presentation includes the available base components and each of the different categories of available options for the product or service. The consumer begins assembling the product or service by selecting one of the base components (box 420). "Selecting" means that a cursor of a pointing device (such as mouse cursor) is moved to a location overlying a selection. In a preferred embodiment, it not necessary to click the selection with the pointing device in order to initiate updating, and simply moving the cursor of the pointing device over the selection provides automatic and real-time updating of the product or service representation, available options and attributes. Moreover, in a preferred embodiment, the updating is displayed to the consumer only when the cursor is positioned over the selection and is not permanently updated until the selection is clicked.

An update is performed on the user interface, representation of the product or service and the available options based on which base component was selected (box 430). Further, the user interface (including the attributes associated with the product or service) is updated to show any changes that have occurred because of the selection (such as updating of the total cost or total calories). In addition, the representation of the product or service shown in the user interface is updated so that the consumer is informed as to what has been ordered. As mentioned above, this representation includes a graphical and an audio representation. For instance, if the product or service is represented graphically by a photograph the photograph may be updated by adding the option selected to the photograph. This provides the consumer using the present invention with real-time information as to which options have been selected.

In a preferred embodiment the present invention provides previewing capabilities so that the base component or option does not need to be selected for updating to occur. For example, if the representation of the product or service is graphical, updating may occur if the consumer positions a pointing device (such as a mouse) over an icon of an available option. For instance, a total price, total calories and currently available options may be updated and presented to the consumer if the consumer holds a mouse cursor over an icon for a length of time. This preview capability alleviates having to select an option to see the outcome only to later reverse that selection.

The selection of a base component or option may also influence the availability of subsequent options. As explained further below in connection with FIG. 5, the subsequent options may become unavailable depending on which of the base components and previous options was selected. There are several ways the consumer may be notified that these options have become unavailable. In a preferred embodiment, the unavailable option not represented in the category of available options. Alternatively, if there is a graphical representation of the category, the unavailable option is "grayed out" (is colored a shade of gray) to indicate that the option is unavailable. Further, the consumer is prevented from selecting an unavailable option (such as by clicking on the unavailable option with a mouse). For embodiments that include audio representations the unavailable option can be deleted from the audible list of options. This automatic and real-time updating of the availability of subsequent options prevents consumer frustration and ordering delays by preventing the consumer from selecting an unavailable option.

A category of available options is then presented to the consumer through the client (box 440). Unavailable options, if any, are made unselectable as described above. The consumer then examines and selects the desired available options within the category (box 450). Based on the option selected, a user interface (including attributes), representation of the product or service and available options are updated (box 460). A check is then made to see if there are more categories of options available (box 470). If so, the consumer is directed to a new category of available options. Otherwise, the consumer is invited to finalize the order (box 480).

Finalizing the order can include, for example, proceeding to a checkout that may include payment and shipping options. In a preferred embodiment, payment and shipping options include graphical and audio representations. A graphical representation may include icons symbolizing the various ways payment and shipping can occur. For instance, a payment screen may show credit card, digital check and digital wallet icons, and the shipping screen may show airplane, truck and ship icons. An audio representation may include sounds associated with the various payment and shipping options (such as a airplane sound for shipping by air).

Figure 5:
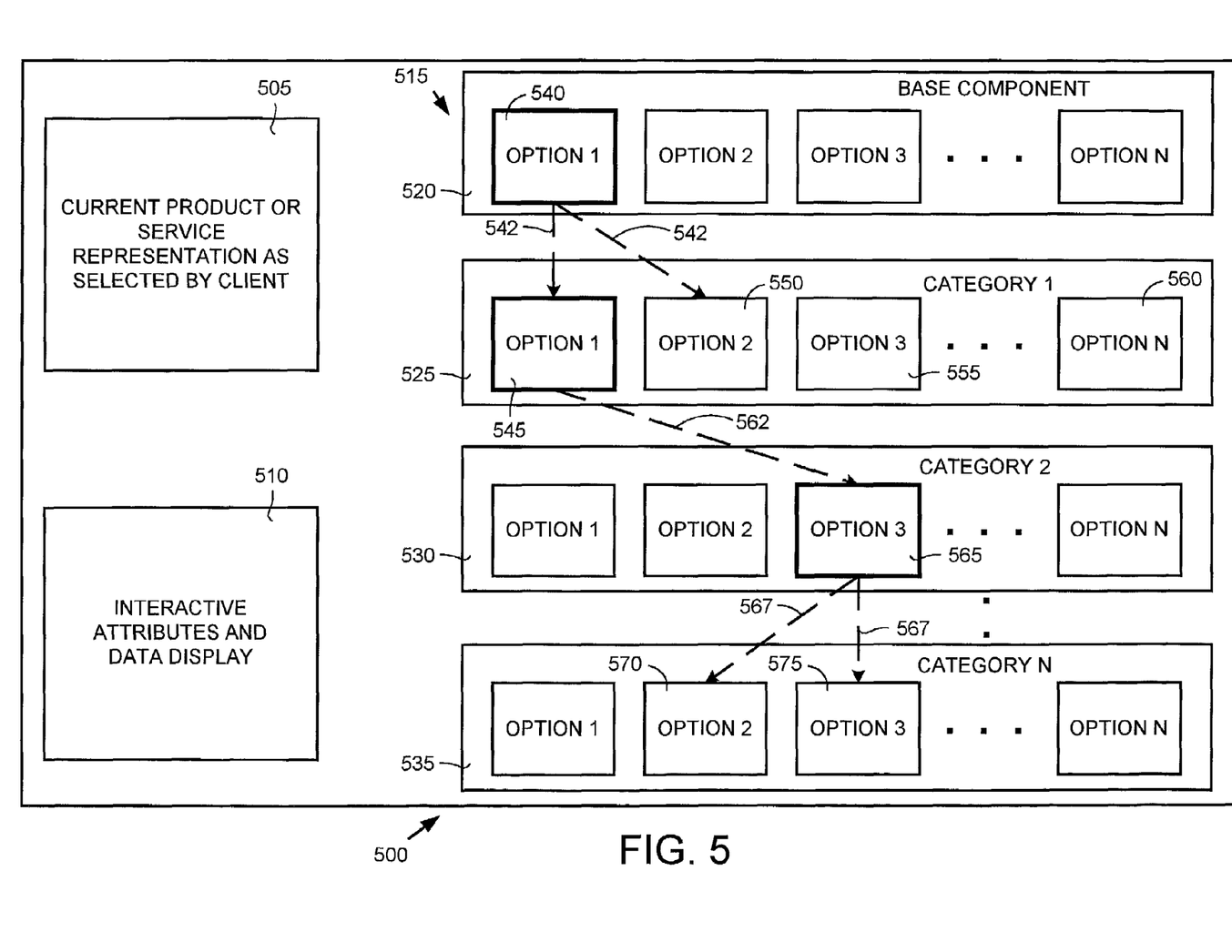
FIG. 5 is a block diagram illustrating a processing method in accordance with the present invention.

As mentioned above, available options may change depending on which base component and subsequent options are selected. In other words, the choices that have been made previously may affect the choices that are available in the future. FIG. 5 is a block diagram that illustrates an example of how previous choices can affect subsequent choices. A user interface 500 includes a representation window 505 that illustrates a current graphical representation of a product or service as selected by the consumer. The user interface 500 also includes an interactive attributes and data display window 510 that provides current attributes and data information that is updated according to the selections made by the consumer.

An options window 515 provides the consumer with a representation of the options categories and the available options within each category. This options window includes a base component category (520), a category 1 (525), a category 2 (530) and a category N (535). Each category has a certain number of options available, and each of the categories in this is shown as initially having N available options.

As an example of how the updating of available options operates, assume that the consumer starts with the base component category (520) and selects option 1 (540). As shown by the dashed lines 542, the selection of option 1 (540) in the base component category (520) automatically and in real time limits the available options in category 1 (525). Specifically, only option 1 (545) and option 2 (550) within category 1 (525) are available options because of the selection in the base component category (520). The other options in category 1 (525) including option 3 (555) through option N (560) are made unavailable to and cannot by selected by the consumer.

If option 1 (545) in category 1 (525) is selected then the available options in other categories are automatically updated in real time. As shown by the dashed line 562, the only option that is shown as available in category 2 (530) is option 3 (565). Selection of option 3 (565) in category 2 (530) immediately updates the available options in the other categories including category N (535). As shown by the dashed lines 567, option 2 (570) and option 3 (575) are shown as available in category N (535) based on the preceding selections. Many other selection combinations are possible, and all include real time updating of available options (as illustrated in this example) as well as attributes and statistical data occurs based on selections made by the consumer.

IV. Working Example

FIGS. 6-11 are exemplary user interfaces of a working example of the system and method of the present invention. The following description of this working example us pro-vided to illustrate only one of several ways in which the present invention may be implement. In this working example, the product is a notebook computer and a user interface for a notebook computer ordering system is illustrated. The user interface includes an attributes area 600 that includes a total cost window 605 and a total weight window 610. Below the attributes area 600 is a representation window 615 that, preferably, graphically depicts the product or service as it has been selected by the consumer. As discussed above, this representation window 615 is automatically and in real time updated to depict the current selections.

Figure 6:
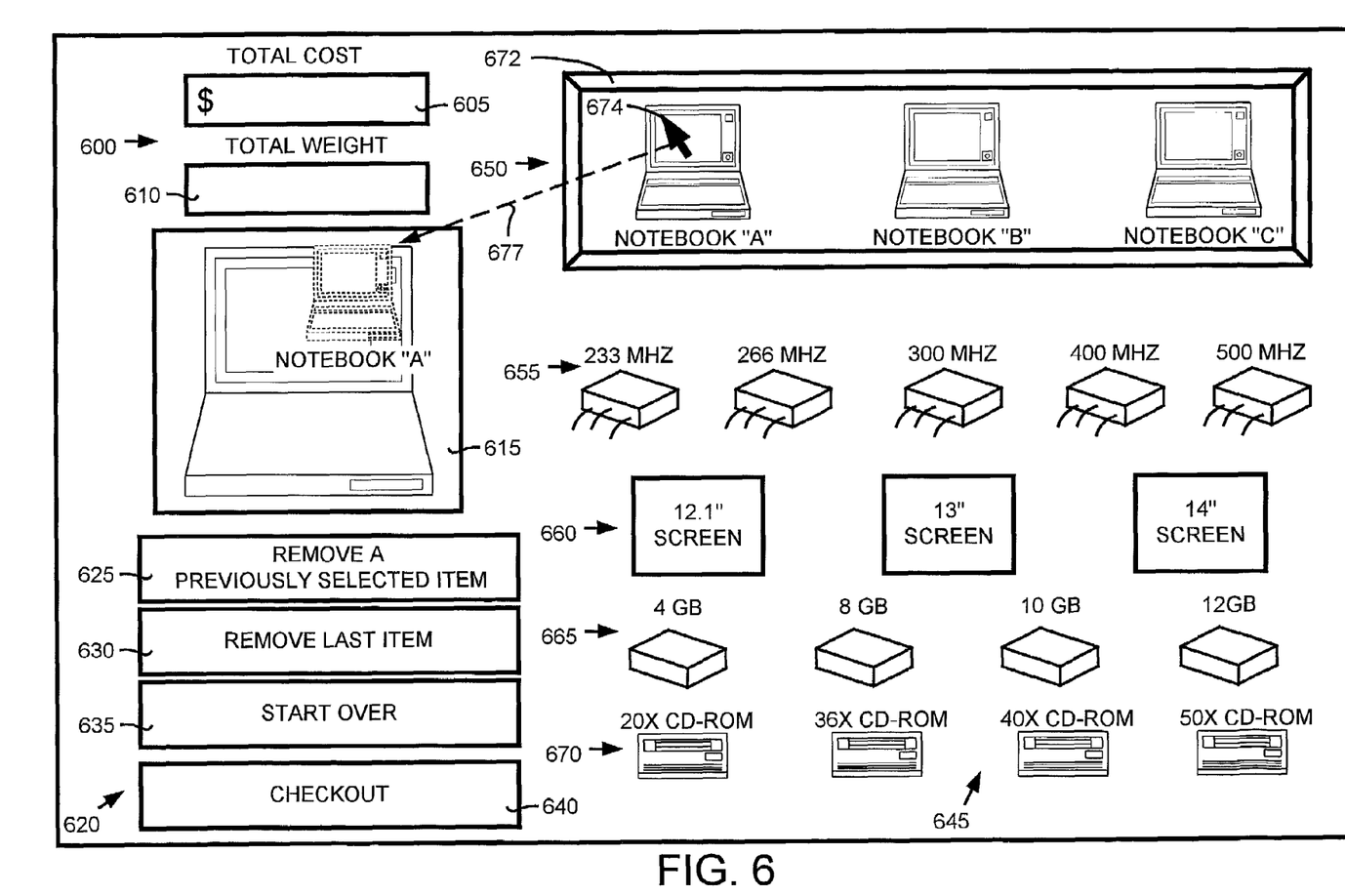
FIGS. 6-11 are exemplary user interfaces of a working example of the system and method of the present invention.

Under the representation window 615 is the interactive area 620 that provides an interactive interface for the consumer. In this working example, the interactive area 620 includes a box for removing a previously selected item (box 625), a box for removing the last item selected (box 630), a box for starting the ordering process over (box 635) and a box for proceeding to checkout (box 640). An options area 645 is shown to the right of the attributes area 600, representation window 615 and interactive area 620. The options area 645 includes all of the categories into which the product or service has been divided. In this example, the notebook computer has been divided into a case category 650, a processor category 655, a screen category 660, a hard drive category 665 and a CD-ROM drive category 670. It should be noted that several other categories (such as DVD drives and docking accessories) may be used with this system, but are not shown due to space considerations.

In this working example, a selection first is made in the case category 650, as illustrated by a frame 672 around the case category 650. The cursor 674 of a mouse is placed on notebook "A", the mouse is clicked and, as shown by the dotted line 677, notebook "A" is dragged to and dropped in the representation window 615. It should be noted that in a preferred embodiment the selection can be dragged and dropped anywhere within the representation window 615.

Figure 7:
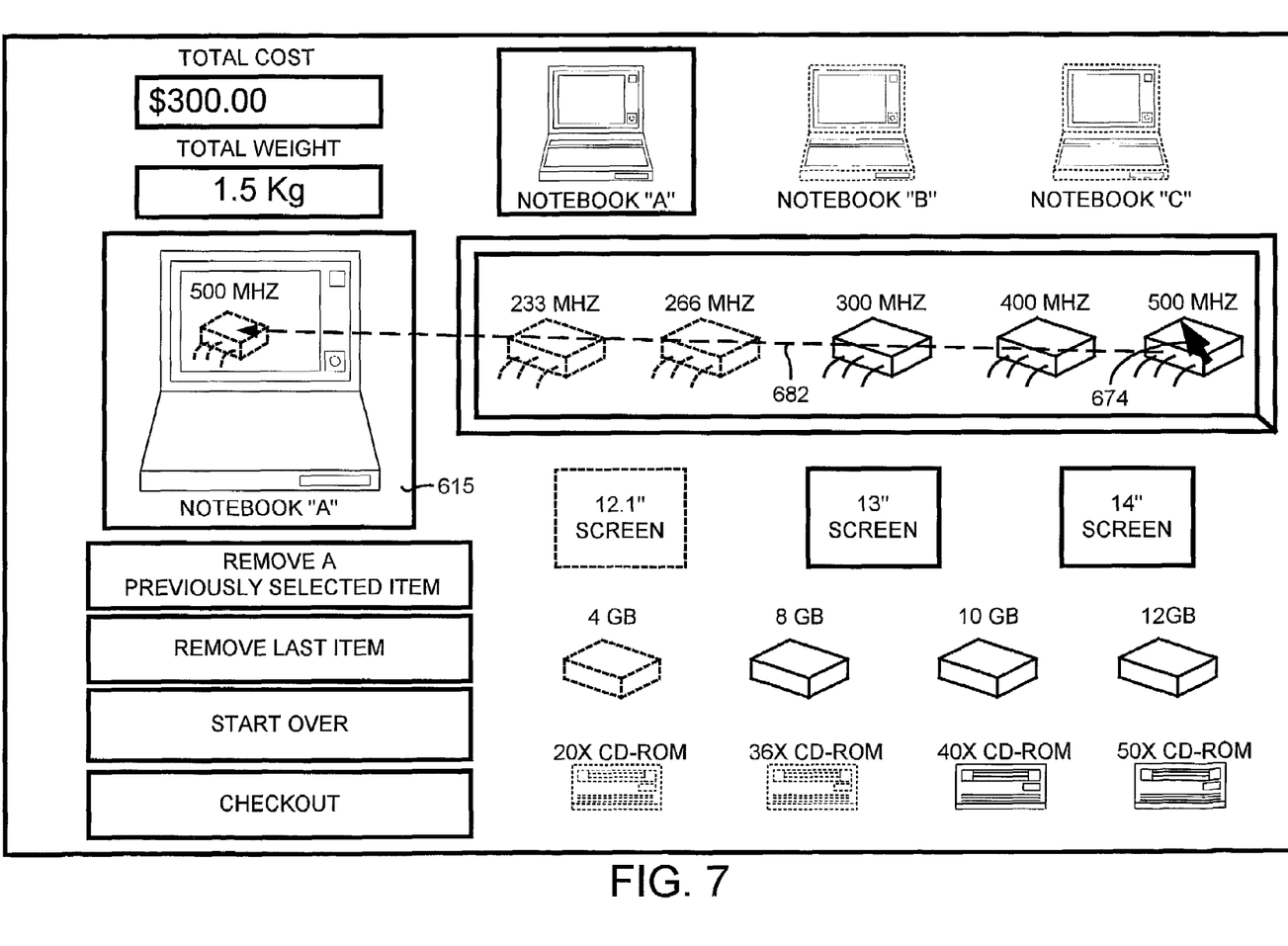

Referring to FIG. 7, the user interface is shown just after notebook "A" was dragged to and dropped in the representation window 615. The representation window 615 has been updated, and now depicts notebook "A". Further, the total cost window 605 has been updated to shown the total cost of the order thus far and the total weight window 610 has been updated to show the total weight of the order. The options available in the remaining categories have also been updated based on the selection of notebook "A". In particular, in the processor category 655 the 233 MHz processor and the 266 MHz processor have been faded out (as shown by dotted lines), indicating that those options are not available. Alternatively, the 233 MHz and the 266 MHz processors could have been removed from the processor category 655 altogether. Other options shown as unavailable (based on the selection of notebook "A") are the 12.1 inch screen, the 4 gigabyte (GB) hard drive and the 20× and 30× CD-ROM drives.

The frame 672 has been moved down to highlight the processor category 655 and indicates that a selection should now be made from the processor category 655. A selection is then made from the processor category 655 (noting that the 233 MHz and 266 MHz processors cannot be selected). In this example a 500 MHz processor is selected. Similar to above, a selection is made by positioning the cursor 674 over the 500 MHz processor and clicking the mouse. As shown by the dotted line 682, the 500 MHz processor is then dragged to the representation window 615 and dropped.

Figure 8:
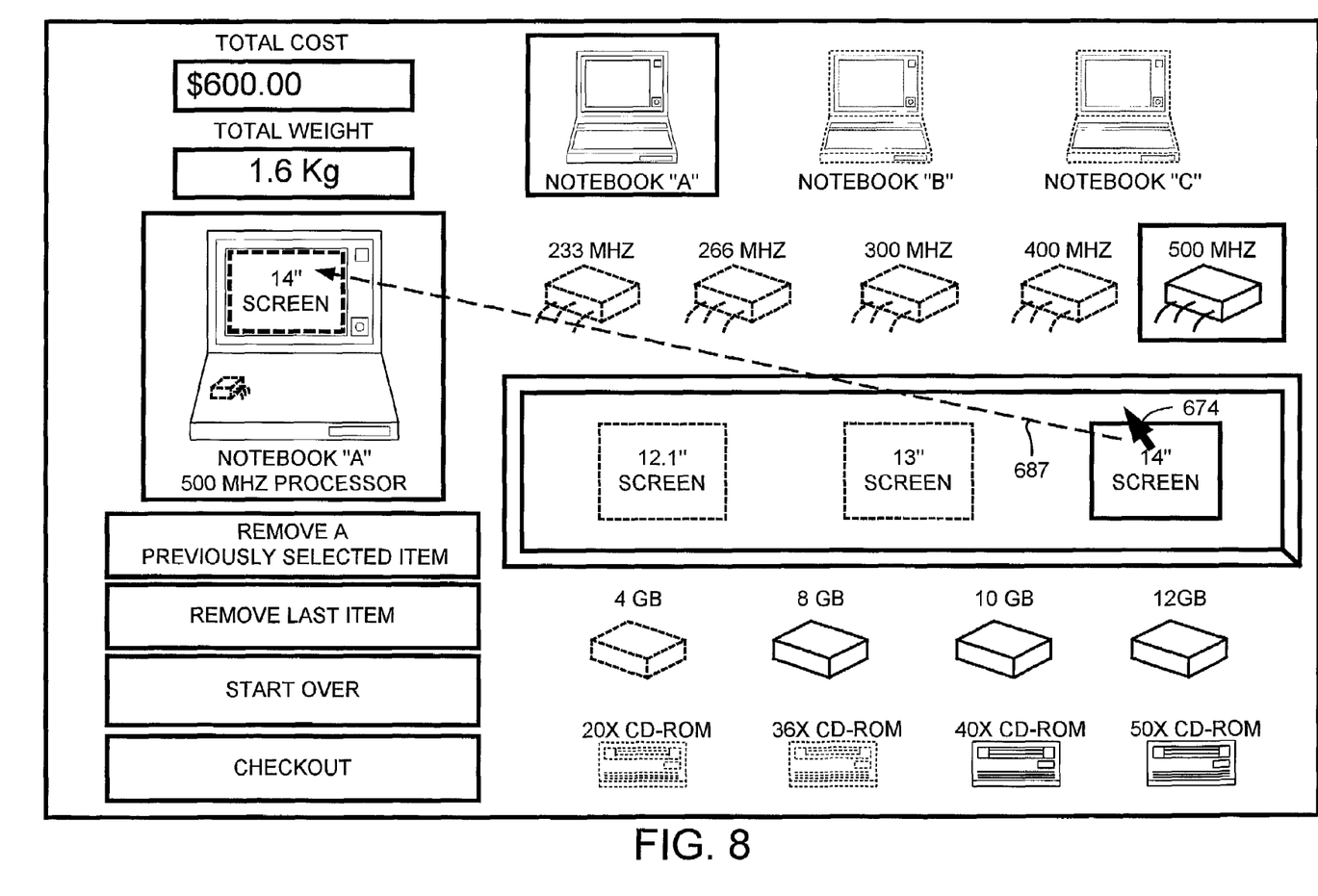

FIG. 8 shows the user interface after the 500 MHz processor has been dragged and dropped in the representation window 615. The total cost window 605 and the total weight window 610 have both been updated to reflect the additional cost and weight of the 500 MHz processor. In addition, the representation window 615 has been updated to illustrate the addition of the 500 MHz processor (in the correct location the processor occupies in the notebook computer) and the available options in the remaining categories have been updated. Specifically, in addition to the 4 GB hard drive the 8 GB hard drive has also become unavailable with the selection of the 500 MHz processor, and the 20× and 30× CD-ROM drives remain unavailable.

The frame 672 is now around and highlights the screen category 660 indicating an option should be selected. In this case, only the 13 inch and 14 inch screens are available. As shown by the dotted line 687, the 14 inch screen is selected by positioning the cursor 674 over the 14 inch screen, clicking the mouse, dragging and dropping the 14 inch screen into the representation window 615.

Figure 9:
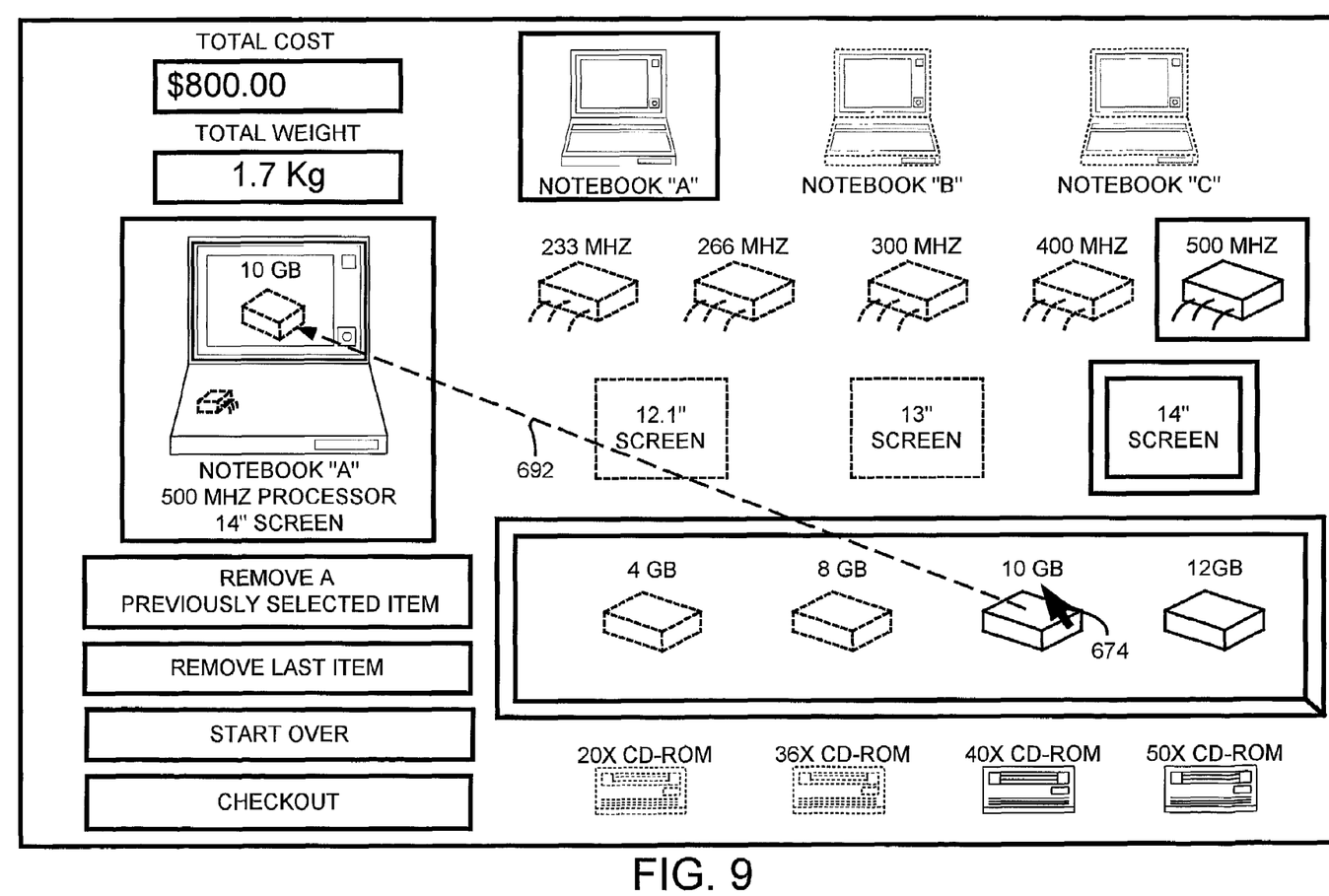

FIG. 9 illustrates the user interface after the selection of the 14 inch screen. The total cost window 605 and the total weight window 610 have been updated along with the available options (note that the 20× and 30× CD-ROM drives remain unavailable). The representation window 615 depicts a notebook computer with all the options that have been selected thus far. The frame 672 is highlighting the hard drive category 665 and, as shown by the dotted line 692, the 10 GB hard drive is selected by dragging and dropping the 10 GB hard drive onto the representation window 615.

Figure 10:
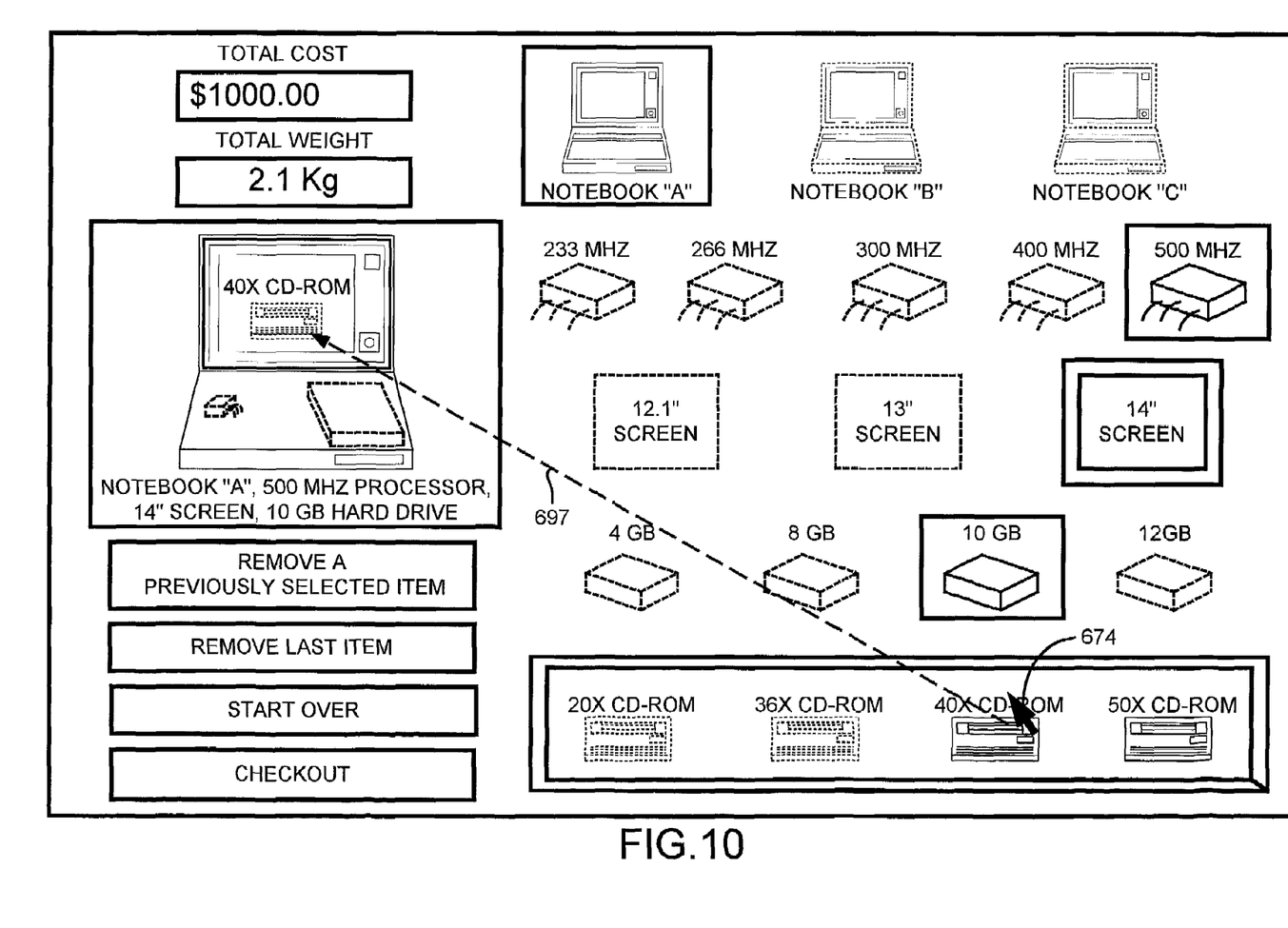

FIG. 10 shows the user interface after the selection of the 10 GB hard drive. In particular, the total cost window 605 and the total weight window 610 have been updated to reflect the additional cost and weight of the hard drive. The representation window 615 has also been updated to illustrate the addition of the 10 GB hard drive to the notebook computer (in the correct location the hard drive occupies in the notebook computer). The frame 672 is highlighting the CD-ROM drive category 670 indicating that a CD-ROM option should be selected. As shown by dotted line 697, a 40× CD-ROM drive is selected by dragging and dropping the drive into the representation window 615.

Figure 11:
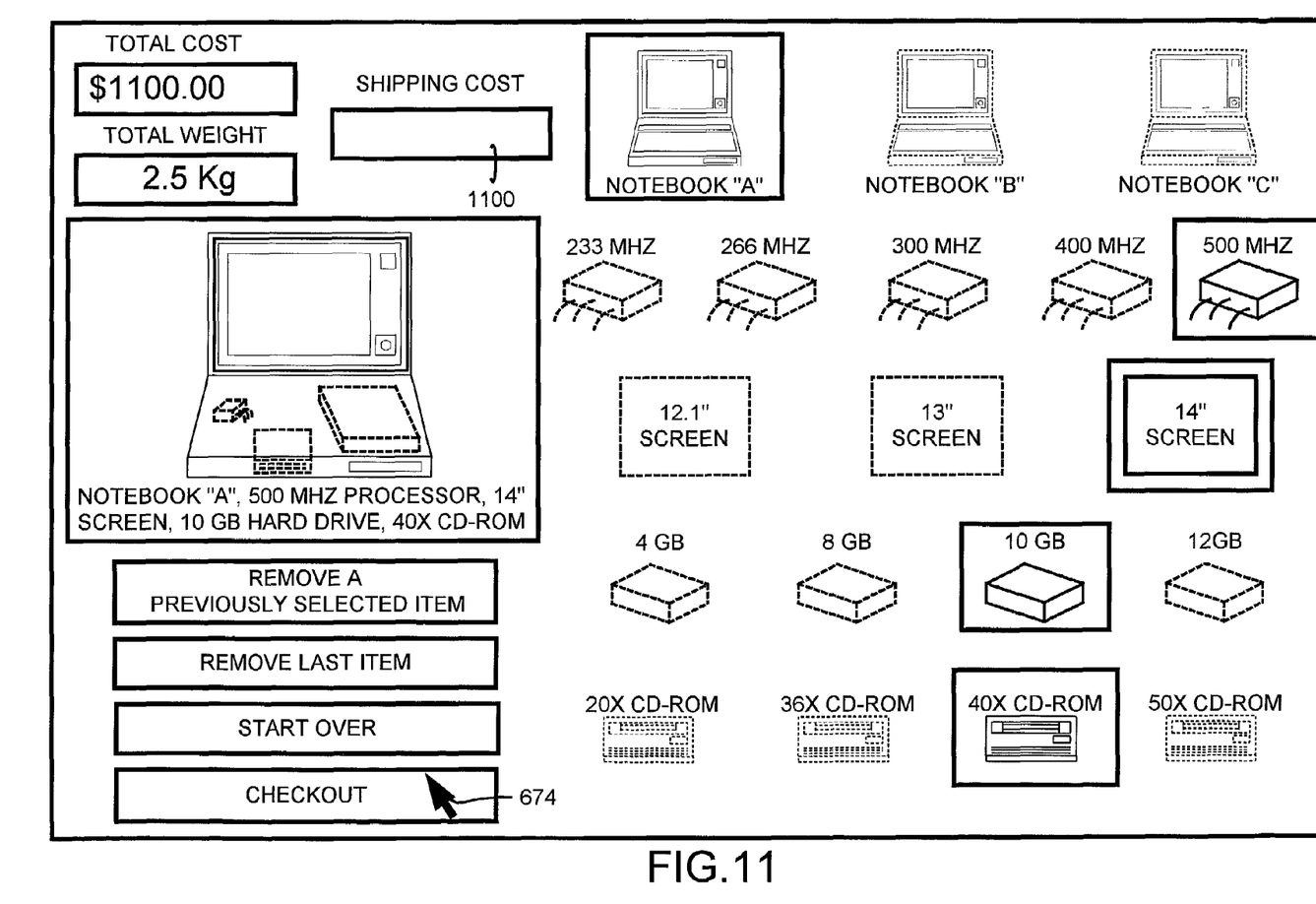

FIG. 11 illustrates the user interface after the selection of the 40× CD-ROM drive and prior to clicking the checkout button (box 640). The total cost 605 and total weight 610 windows have been updated and reflect the addition of the 40× CD-ROM. Further, the representation window 615 illustrates the notebook computer as selected (with the CD-ROM drive in the correct location it occupies in the notebook computer) and configured by the consumer in the ordering process. In this example the consumer is now ready to proceed to checkout (box 640), which may include, for example, selecting a payment method and a shipping method. In this working example, when checkout (box 640) is selected a shipping cost window 1100 appears providing to the user the costs of shipping the order.

At any time during the ordering process the consumer could have selected a button to remove a previously selected item (box 625), remove the last item selected (box 630) or start over (box 635). Further, after each option is selected the attributes area 600, representation window 615 and available options in the options area 645 are updated automatically in real time so that the consumer remains continuously informed of the consequences (such as cost, weight and available options) of each selection. Moreover, the representation window provides the consumer with a real-time depiction of what is actually being ordered.

The foregoing description of the preferred embodiments of the invention has been presented for the purposes of illustration and description. It is not intended to be exhaustive or to limit the invention to the precise form disclosed. Accordingly, the foregoing description should be regarded as illustrative rather than restrictive, and it should be appreciated that variations may be made in the embodiments described by workers skilled in the art without departing from the scope of the present invention as defined by the following claims.

What is claimed is:

1. A computer-implemented ordering system, comprising:
an interface adapted to provide a representation of a consumer item and an option associated with the consumer item; and
a presentation module adapted to provide a real-time preview representation of the consumer item updated with the option in response to a user clicklessly positioning a cursor over an icon corresponding to the option, the presentation module adapted to indicate to the user unavailability of at least one other option associated with the consumer item based on the update to the consumer item.

2. The system of claim 1, wherein the presentation module is adapted to update a stored representation of the consumer item updated with the option in response to the user clicking on the icon.

3. The system of claim 1, wherein the option associated with the consumer item depends at least in part on a previously selected option.

4. The system of claim 1, wherein the presentation module is adapted to provide attribute data associated with the consumer item.

5. The system of claim 1, wherein the presentation model is adapted to automatically update in real-time attribute data associated with the preview representation of the consumer item updated with the option.

6. The system of claim 1, wherein the presentation module is adapted to prevent selection of the option by a user in response to a previously selected option by the user.

7. The system of claim 1, wherein the presentation module is adapted to provide an audio preview representation of the consumer item updated with the option.

8. A computer-implemented ordering method, comprising: providing a representation of a consumer item and an option associated with the consumer item;
providing a real-time preview representation of the consumer item updated with the option in response to a user clicklessly positioning a cursor over an icon corresponding to the option;and indicating to the user unavailability of at least one other option associated with the consumer item based on the update to the consumer item.

9. The method of claim 8, further comprising updating a stored representation of the consumer item updated with the option in response to the user clicking on the icon.

10. The method of claim 8, further comprising providing attribute data associated with the consumer item.

11. The method of claim 8, further comprising automatically updating in real-time attribute data associated with the preview representation of the consumer item updated with the option.

12. The method of claim 8, wherein providing a representation comprises providing an audio preview representation of the consumer item updated with the option.

13. The method of claim 8, further comprising preventing selection of the option by a user in response to a previously selected option by the user.

14. A computer-implemented ordering system, comprising:
- means for providing a representation of a consumer item and an option associated with the consumer item;
- means for providing a real-time preview representation of the consumer item updated with the option in response to a user clicklessly positioning a cursor over an icon corresponding to the option;and
- means for indicating to the user unavailability of at least one other option associated with the consumer item based on the update to the consumer item.

15. The system of claim 14, wherein the means for providing a real-time preview representation comprises means for updating a stored representation of the consumer item updated with the option in response to the user clicking on the icon.

16. The system of claim 14, wherein the means for providing a real-time preview representation comprises means for providing attribute data associated with the consumer item.

17. The system of claim 14, wherein the means for providing a real-time preview representation comprises means for automatically updating in real-time attribute data associated with the preview representation of the consumer item updated with the option.

18. The system of claim 14, wherein the means for providing a real-time preview representation comprises means for preventing selection of the option by a user in response to a previously selected option by the user.

19. The system of claim 14, wherein the means for providing a real-time preview representation comprises means for providing an audio preview representation of the consumer item updated with the option.

20. The system of claim 14, further comprising means for acquiring statistical data associated with the consumer item.

\* \* \* \* \*

UNITED STATES PATENT AND TRADEMARK OFFICE
CERTIFICATE OF CORRECTION

| | | |
|---|---|---|
| PATENT NO. | : 7,328,171 B2 | Page 1 of 1 |
| APPLICATION NO. | : 09/439626 | |
| DATED | : February 5, 2008 | |
| INVENTOR(S) | : Jacques H Helot et al. | |

It is certified that error appears in the above-identified patent and that said Letters Patent is hereby corrected as shown below:

In the Claims:

In column 12, line 33, in Claim 5, delete "model" and insert -- module --, therefor.

In column 12, line 49, in Claim 8, delete "option;and" and insert -- option; and --, therefor.

In column 13, line 8, in Claim 14, delete "option;and" and insert -- option; and --, therefor.

Signed and Sealed this
Twenty-eighth Day of January, 2014

Michelle K. Lee
*Deputy Director of the United States Patent and Trademark Office*